3,110,572
PROCESS AND APPARATUS FOR GRANULATING AND DRYING PARTICLES
Ruediger Lothar von Reppert, Wiesbaden, Germany, assignor to Chemische Werke Albert, Wiesbaden-Biebrich, Germany, a corporation of Germany
Filed Mar. 16, 1960, Ser. No. 15,289
Claims priority, application Germany Mar. 24, 1959
4 Claims. (Cl. 34—20)

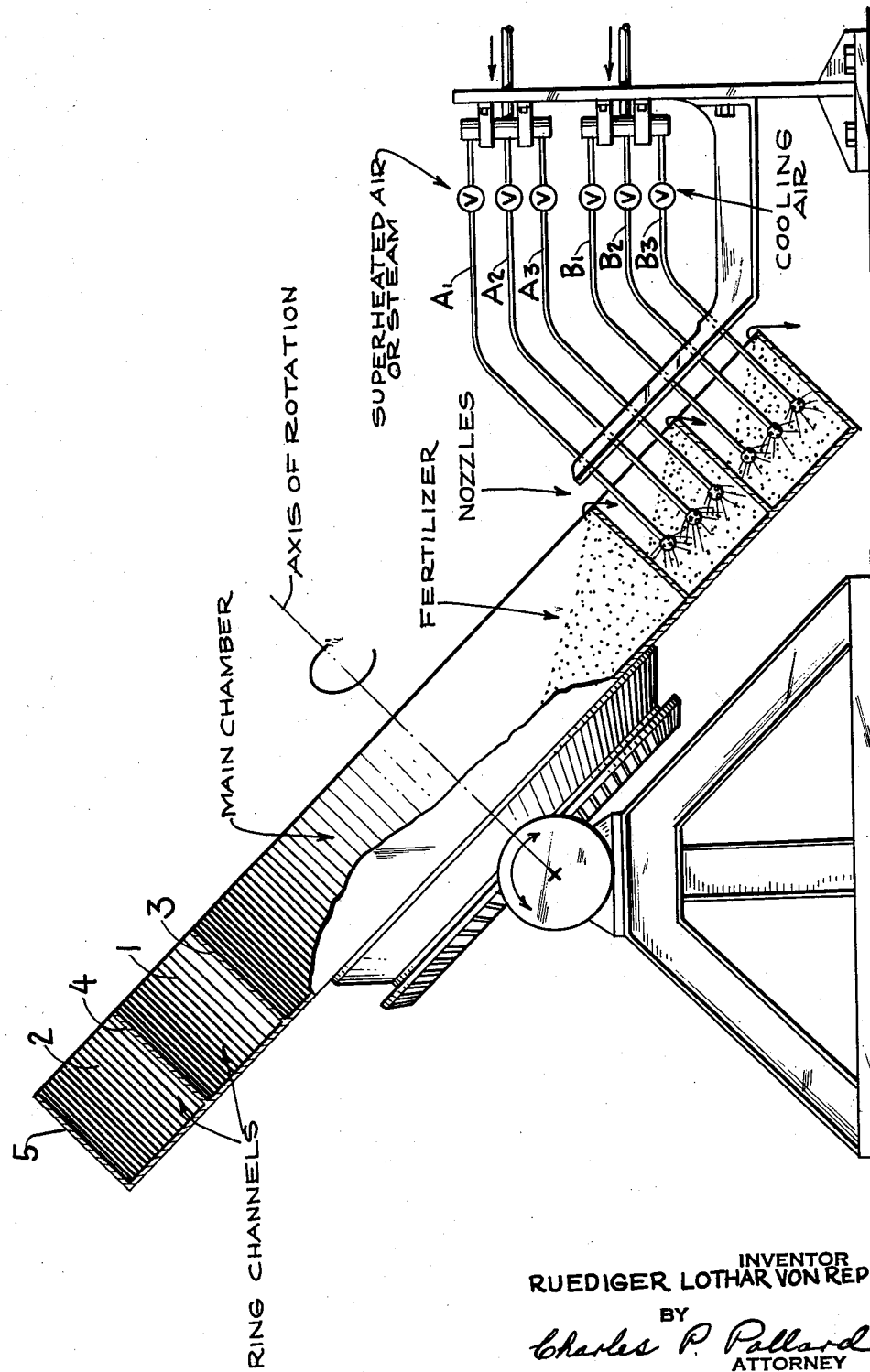

This invention relates to a process for drying material granulated in a plate, or disc, granulator and to an apparatus for granulating finely divided, or powdery, material.

In recent years, the manufacture and use of granular products, such as fertilizers, have gained more and more importance. Before long, one can expect that many products, especially fertilizers, will be sold exclusively in granular form.

In the production of granular material from finely divided, or normally powdery, material, one customarily uses water or some other volatilizable liquid in quantities sufficient to cause agglomeration of the finely divided particles. Depending on the material and the process of manufacture, the material to be granulated may contain enough moisture to form agglomerates or water may be added in the necessary amounts in accordance with known procedures. For economic reasons, the agglomerates are preferably formed in the cold, and under any circumstances, the moisture used in the agglomeration of the finely divided particles must be at least partially removed in order to form firm granules. The presence of excessive amounts of moisture in granules can be especially disadvantageous in the production of granular multinutrient fertilizers containing hygroscopic salts such as ammonium nitrate, thiourea and the like.

It is a primary object of this invention to provide a very simple, inexpensive and exceptionally efficient process and apparatus for producing granular material. It is a special object of the invention to provide such a process and apparatus whereby the drying of granulated material is substantially more effective and more efficient.

The above, and other features and advantages of the invention will become apparent from the more detailed description of the illustrative embodiments of the invention read in connection with the accompanying illustrative drawings forming a part hereof, and wherein the single FIGURE constitutes a diagrammatic representation provided with appropriate legends and showing a rotary plate, or disc, granulator embodying the present invention.

Referring to the drawings, it will be seen that the rotary plate granulator is provided with a central granulating compartment surrounded by two concentric annular channels 1 and 2. The central granulating compartment, or chamber, and surrounding channels are bounded by three annular collars, or flanges, 3, 4 and 5. As shown, the first channel 1 is provided with three nozzles A1, A2 and A3 for leading superheated air, or steam, into the channel space below the surface of the granular material being dried (fertilizer). The second channel 2 likewise is shown with three nozzles B1, B2 and B3 projecting cooling air downwardly thereinto and terminating below the surface.

The granulator works as follows:

The material to be granulated is continuously placed on the inclined plate granulator which is rotating about its axis. Where necessary, as is often the case in the granulation of freshly prepared superphosphates, a granulating liquid such as water, or water glass may be added in a known way. In this type of granulation, during the rotation of the plate granulator the material slides downwardly and the finely divided particles agglomerate into pellets of increasing size but of relatively high moisture content. The quantity of the inflowing material to be granulated is selected so that the desired granulation is complete when the quantity of introduced material fills the annular space between the granulating plate and the wall of the adjacent annular channel. The inclination of the rotary plate granulator and the speed of rotation may be adjusted to suit the characteristics of the material being granulated. When this angular space is filled, the granulated substance overflows into the first annular channel, as indicated by the arrows, and ultimately fills the annular space between the annular wall of this channel and the adjacent second annular channel. A drying fluid under pressure, advantageously superheated steam or superheated air, is introduced into the bed of moist material by the nozzles dipping into the bed of granular material. In turn, the hot and, at least partially dried, granules (assisted by the fluidizing effect of the drying gases) overflow into the second annular channel where they are further dried and cooled by the cooling air, or the like, introduced in the same manner as the drying fluid. For the granulation of a particular material, the inclination of the plate granulator and the positioning of the nozzles may be fixed relative to one another as shown herein for illustrative purposes. It will be apparent, however, that the nozzles may be adjustably mounted so as to permit the granulation of a variety of materials in the apparatus. Finally, the cooled granules overflow the outer annular wall, or flange, where they are collected and packaged in a conventional manner. This extraordinarily simple apparatus converts originally damp and fine material into firm and dry granules.

Although important advantages of the invention are obtained by using a single nozzle in the annular drying and cooling channels, it has been found that it is more advantageous to use a plurality of nozzles to obtain a maximum effect so that drying and cooling gases may contact the granulated materials from a number of directions.

The granular material, before being dried, may be dusted or powdered in a conventional manner. In this way, for instance, so-called trace elements may be introduced into granular fertilizers.

It has been observed that the granular materials are dried exceptionally, and unexpectedly, fast by use of the process and apparatus of this invention. It would appear that the free rolling of the granular material on the floor of the annular channel surrounding the granulating compartment permitted the superheated steam, or air, to escape immediately into the free atmosphere thereby avoiding condensation of the vaporized moisture. Also, due to the rotation of the plate granulator, and the raking effect of the nozzles, the granules are constantly tumbled and constantly contacted from all sides by the superheated steam or the like so that the granules dry rapidly and evenly.

Kindred advantages were obtained in the cooling chamber.

The significance of the invention and its scope will be illustrated further by the following examples.

*Example 1*

In a disc granulator, such as illustrated herein, 10 metric tons per hour of a granulated superphosphate was formed. The granulated material, before drying had a content of 17.5% water- and citrate-soluble $P_2O_5$ and a content of 10% $H_2O$. The granulated material was heated and dried in the annular drying zone by injecting superheated steam at 2½ atmospheres through a nozzle mounted around the disc granulator and dipping into the body of granular material located in the drying channel. In this way, 400 kg. water per hour was evaporated with a consumption of 205,200 calories. In this way, the hot granular material which flowed into the annular cooling channel surrounding the annular drying channel was further dried and cooled by injecting cooling air into the body of material located therein through two nozzles hung in this annular space. Dried and well hardened superphosphate granules were obtained with a content of 18% water- and citrate-soluble $P_2O_5$ and a content of 6% $H_2O$.

*Example 2*

In the same disc granulator as used in Example 1, 10 metric tons of a granular multi-nutrient fertilizer was prepared having an ammonia/superphosphate/potash content of 8.5/8.5/8.5 and a water content of 8%. The granular material processed in the annular drying and cooling channels by injecting superheated air into the body of granular material located in drying channel and by injecting cooling air into the body of granular material located in the cooling channel. By the use of the superheated air 500 kg. $H_2O$/h. was evaporated from the granules with a consumption of 256,500 calories. Thus, a dry, hard and perfectly granulated multi-nutrient fertilizer was obtained with a composition of ammonia/superphosphate/potash of 9/9/9 and a moisture content of only 3%.

*Example 3*

In a plate granulator, as illustrated herein, pellitized, or granular, thermoplastic molding compositions were formed of 2–3 mm. and which contained 40% phenol resin and 60% fillers.

The pellets were formed from the fillers and a 5% phenol resin solution. After the formation of the moist pellets, they were dried with superheated air produced in a heat exchanger by injecting the superheated air from a nozzle dipping into the annular channel surrounding the granulating compartment. The drying was facilitated by the rotation of the plate granulator and the resulting tumbling action imparted to the granulated material. In this way, the granulated material was heated to 70° C. before it overflowed into the annular cooling channel where it was cooled in a similar manner by the injection of cooling air. Through this drying process, the solvent brought in with the granulating solution was volatilized completely and an absolutely dry and cold, extrudable and moldable granular material was obtained with a bulk density of 500 g./l.

*Example 4*

A fine material for the manufacturing of clay tile floor flags, consisting of ⅔ ton kaolin and, as well, ⅓ ton feldspar, was granulated by the addition of 14% water which was sprayed into a disc granulator fitted with two surrounding ring channels. The granular material was dried down to a 6% water content by injecting superheated air through two nozzles hung in the first ring channel of the disc granulator and dipping into the rotating mass as well as by a further cooling air nozzle dipping, in the same manner, into the second ring channel. The granular material was thereby adjusted to the correct moisture content for subsequent manufacture of tile in hydraulic presses at a molding pressure of 360–400 kg./cm.$^2$.

It will be understood that the illustrative embodiments of the invention set out herein do not constitute a limitation upon the invention for those skilled in the production of granular materials can make various modifications in the details of these illustrative embodiments without departing from the spirit and scope of the invention as set out above and defined in the appended claims.

What is claimed is:

1. In a process for granulating and drying finely divided particles on a substantially plane surface open to the atmosphere, in which at first moist granular particles are formed in a centrally located granulating zone from finely divided moist particles by tumbling the finely divided moist particles on an inclined and rotating annular plate granulator, the improvement which consists in flowing said moist granular particles into an annular drying zone surrounding said granulating zone to form a body of moist granular material, injecting a superheated gaseous drying fluid through an orifice located substantially below the mid-point of said annular zone and substantially below the surface of said body of granular material and thence along the granules upward into the atmosphere to partially dry the moist granules, flowing the partially dried granular particles into a second annular cooling zone surrounding said drying zone to form a body of partially dried granular particles, injecting a cooling gas through an orifice located substantially below the mid-point of said second annular zone and substantially below the surface of said body of partially dried granular particles and thence along the granules upward into the atmosphere to cool and further dry said granular particles.

2. In an apparatus for granulating and drying material, comprising an inclined rotary plate granulator having a centrally located granulating compartment, at least one annular channel surrounding said granulating compartment, including a first annular channel adjacent said compartment, the improvement which consists in arranging at least one nozzle, for introducing a superheated fluid under pressure, projecting downwardly substantially below half way into said adjacent channel so that the openings of the nozzle are situated substantially below the surface of the granular body contained in said annular channel.

3. In an apparatus for granulating and drying material, comprising an inclined rotary plate granulator having a centrally located granulating compartment, and at least two concentric annular channels surrounding said granulating compartment, including a first annular channel adjacent said compartment and a second annular channel adjacent said first annular channel, the improvement which consists in arranging at least one nozzle projecting downwardly substantially below halfway into each of said channels so that the openings of the nozzles are situated substantially below the surface of the granular body contained in said ring channels.

4. In an apparatus for granulating and drying material on a substantially plane surface exposed to the atmosphere, comprising an inclined rotary plate granulator having a centrally located rotary plate granulating compartment bounded by a first annular collar, a first ring channel surrounding said collar and bounded by a second annular collar concentric with said first collar, and a second ring channel surrounding said first ring channel and bounded by a third annular collar concentric with said first collar, the improvement which consists in arranging a plurality of nozzles to project substantially below halfway into each of said ring channels so that the openings of the nozzles are situated substantially below the surface of the granular body contained in said ring channels.

References Cited in the file of this patent

UNITED STATES PATENTS

| | | |
|---|---|---|
| 2,860,598 | Loesche | Nov. 18, 1958 |
| 2,999,336 | Cescas | Sept. 12, 1961 |

FOREIGN PATENTS

| | | |
|---|---|---|
| 1,138,560 | France | Jan. 28, 1957 |
| 1,196,200 | France | May 25, 1959 |